United States Patent Office 2,944,426
Patented July 12, 1960

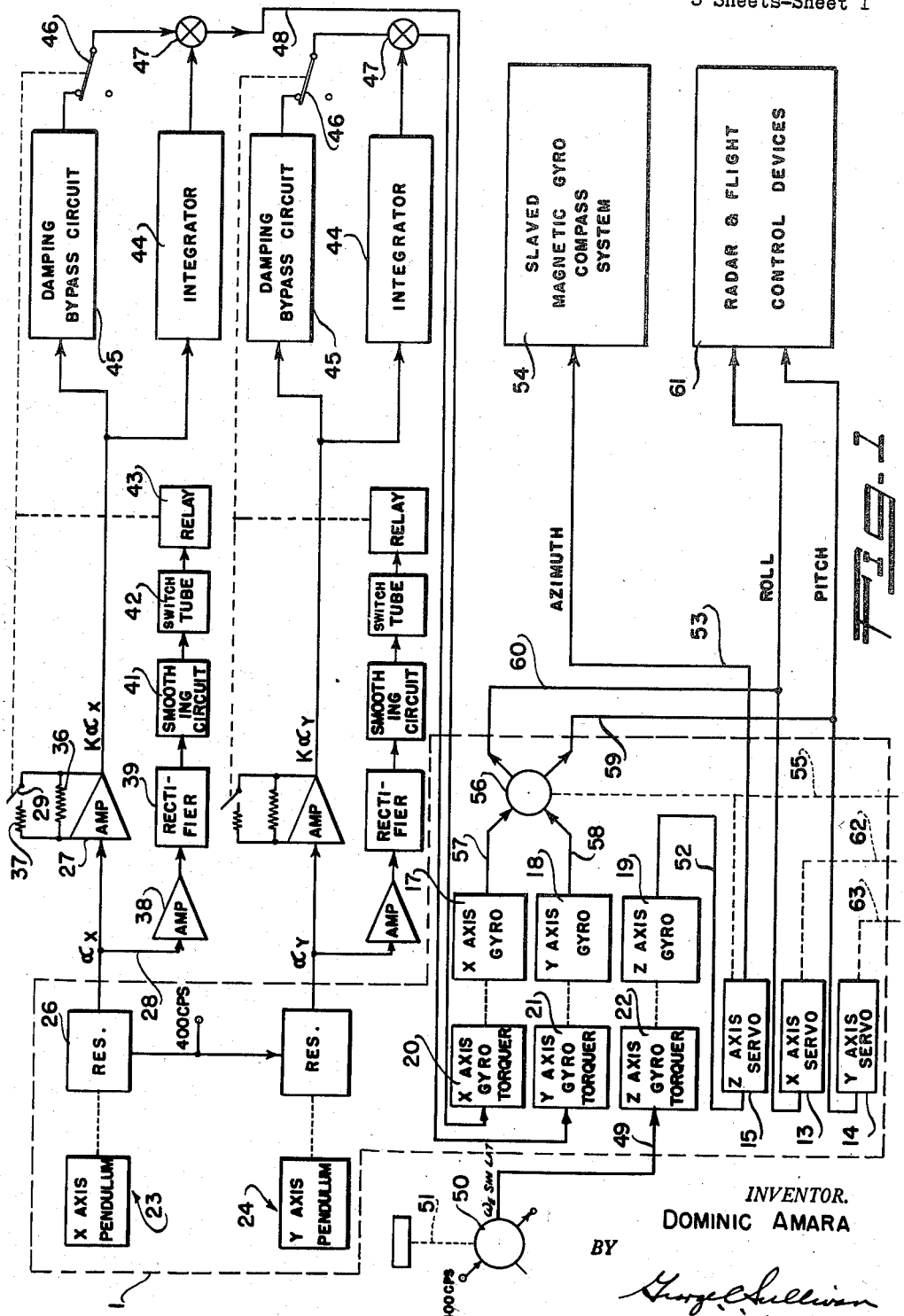

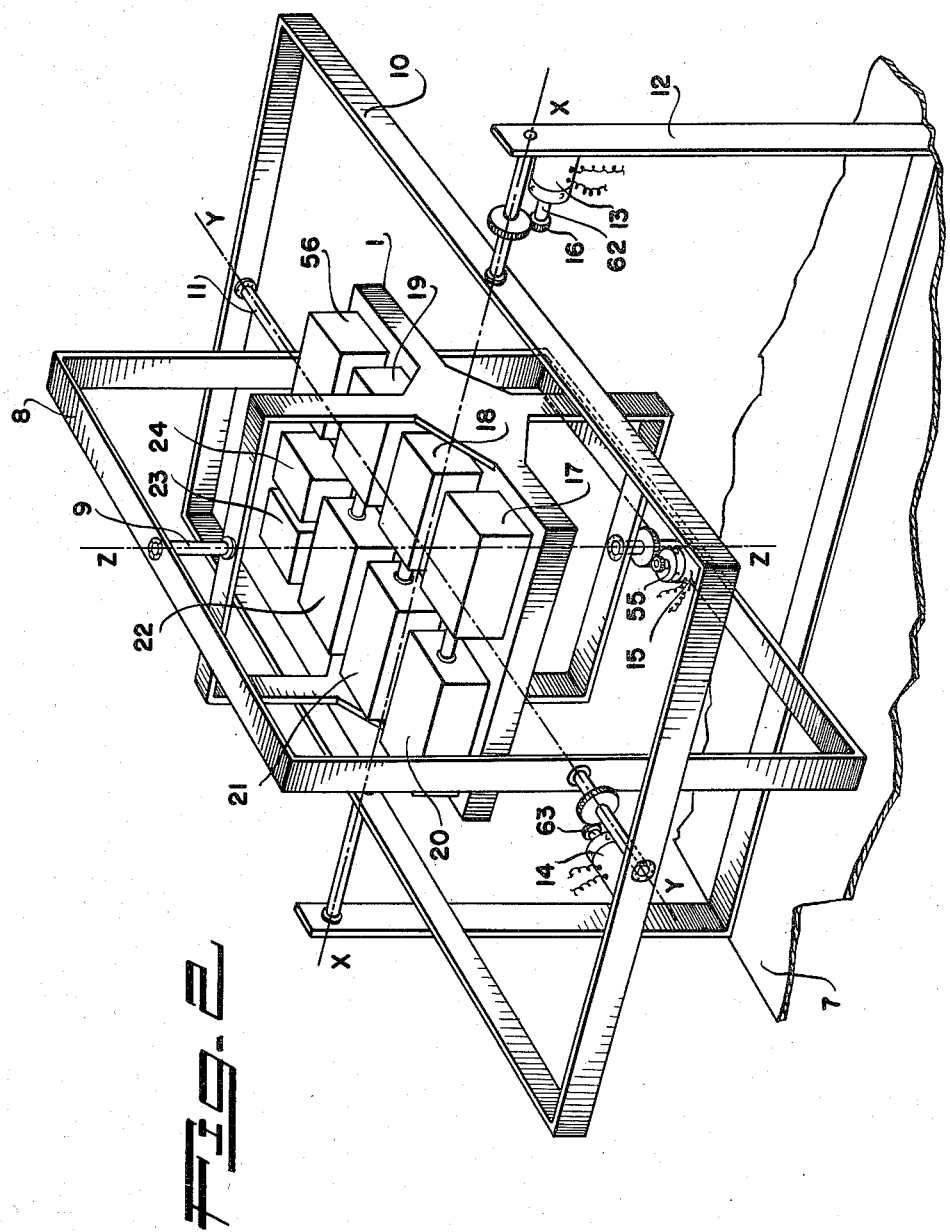

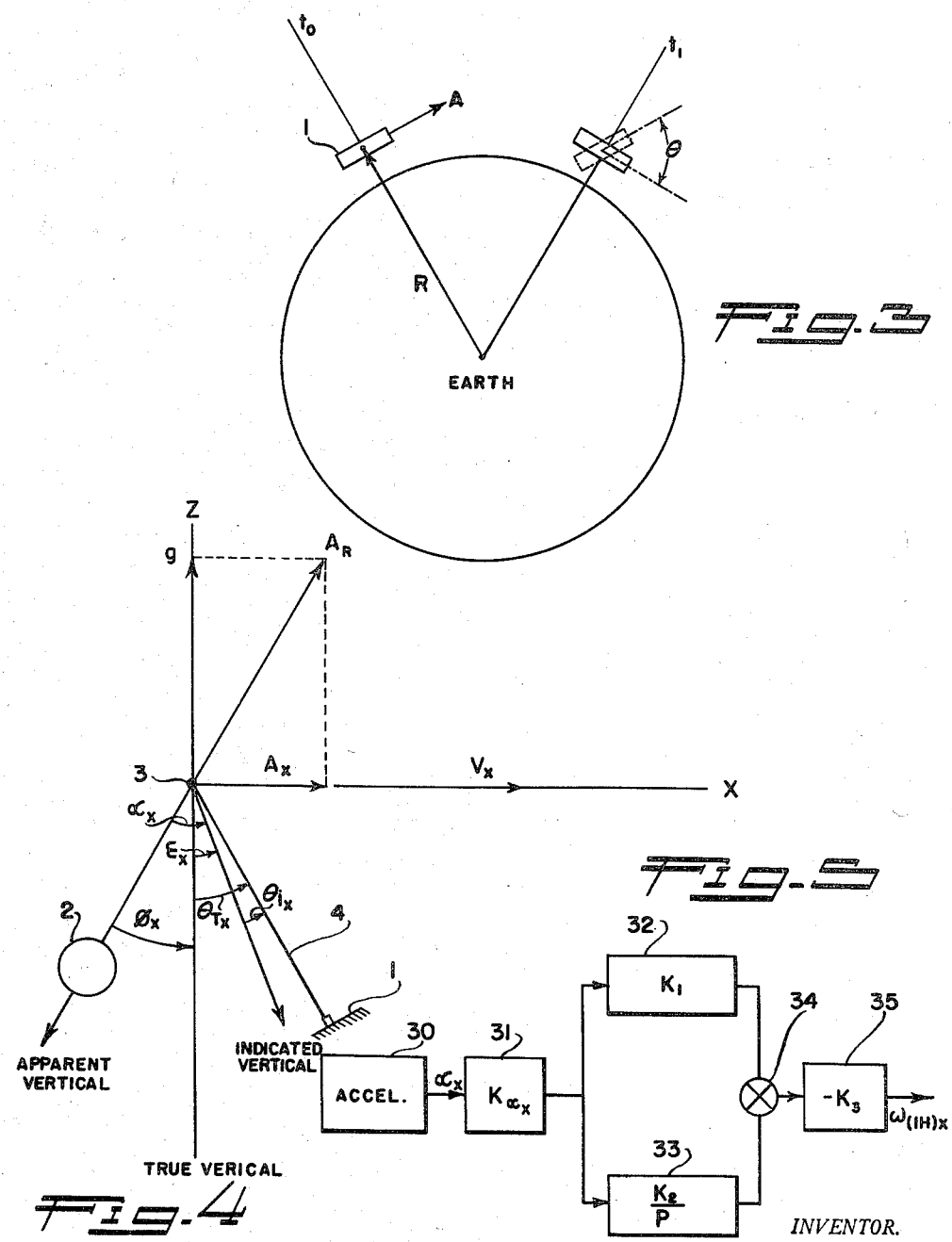

2,944,426

STABILIZED PLATFORM REFERENCE DEVICE

Dominic Amara, Sherman Oaks, Calif., assignor to Lockheed Aircraft Corporation, Burbank, Calif.

Filed May 31, 1956, Ser. No. 588,331

18 Claims. (Cl. 74—5.34)

This invention relates generally to space reference devices such as vertical gyro systems and more particularly to a gyro stabilized platform reference device for supplying roll, pitch and directional orientation information to radar, navigation and flight control equipments and the like on an aircraft or other vehicle which moves relative to the earth.

The reference system, briefly described, employs a three axis gyro stabilized platform with variable tuning. When disturbing aircraft accelerations exist, the system is that of a Schuler tuned gyro pendulum (8.4 minute period). When disturbing accelerations are not present the tuning is altered to produce a much shorter gyro pendulum period of, for example, $1/10$ of the Schuler period. This is achieved by a higher coupling of accelerometers driving the integrators which torque the stabilized platform in the system.

The problem of accurately indicating the vertical on aircraft is a difficult one because of the inability to separate acceleration due to gravity with aircraft accelerations. More practical methods of indicating gravity utilize pendulum accelerometers in one way or another. These devices can sense only the resultant vector acceleration. The direction of the vertical is considered as the direction assumed by a plumb-bob (pendulum) on an unaccelerated platform. A pendulum by itself is an indicator of the vertical, however, if the period of the pendulum is short, it will instantaneously follow the direction of the resultant acceleration which is of course not the true vertical, but may be called the apparent vertical. In the application of the pendulum for indicating the vertical on aircraft, the apparent vertical is averaged over long periods of time and the average taken as the indication of the true vertical. In order to do this, the period of the pendulum has to be made long enough so that it doesn't readily respond to instantaneous accelerations and short enough so that errors due to gyro drift are held within acceptable limits.

Where aircraft accelerations are relatively high and persist for relatively long periods of time such as in many long range, high speed aircraft, large errors in the indication of the vertical with a system employing a fixed period of the pendulum will be obtained. For example, in the flight testing of a conventional vertical gyro system commonly used on aircraft, random vehicle accelerations in the order of 30 milli-g's were found to exist for periods as long as 30 seconds. This resulted in the vertical gyro system displaying a dynamic error in the vertical in excess of 19 mils. This performance is unsatisfactory in many radar, navigation and flight control gear.

It is an object of this invention to provide a gyro reference device which is insensitive to disturbing accelerations for supplying accurate roll, pitch and directional orientation information to a vehicle on which it is mounted.

It is another object of this invention to provide a gyro reference device which minimizes non-ideal effects such as gyro drift and errors in mechanization of associated components in the system.

Another object of this invention is to provide a gyro reference device having variable tuning which is automatically controlled in response to disturbing accelerations.

Still another object of this invention is to provide a gyro reference device which will not only provide an accurate indication of the vertical, but also a superior slaved magnetic gyro compass system.

Further and other objects will become apparent from a reading of the following description, especially when considered in combination with the accompanying drawing wherein like numerals refer to like parts.

In the drawing:

Figure 1 is a schematic block diagram showing the gyro reference device of this invention;

Figure 2 is a perspective view schematically showing a typical platform suspension system for use in the gyro reference device;

Figure 3 is a view illustrating the basic geometry involved in stabilizing a reference platform relative to the earth.

Figure 4 shows the geometry of a vertical indicating system such as that employed in this invention; and Figure 5 is a functional block diagram of the gyro reference system.

In order to provide the necessary background for a complete understanding of the invention embodied in the device shown in Figures 1 and 2, a basic theoretical discussion is presented herein with reference to Figures 3, 4 and 5. Since the actual device is a mechanization of the control and performance equations derived from the theoretical analysis, reference is first made to Figure 3, which illustrates the basic geometry involved in maintaining a reference platform 1 in a constant attitude with respect to the earth when put in motion. Assume platform 1, at time $t_0$, is in the desired attitude normal to the surface of the earth. When this platform is accelerated at a linear rate, A, and moved to position $t_1$, it will no longer be at the same attitude with respect to the earth unless it is rotated from the attitude at $t_0$ to the attitude shown in solid lines at $t_1$. The magnitude of the angular rotation of the platform necessary to move it from the attitude at $t_0$ to the attitude at $t_1$ may be obtained by detecting and operating upon the platform linear acceleration A. Converting the linear acceleration, A, into an angular acceleration $\alpha$ about the center of the earth in accordance with the following relationship $$\alpha = \frac{A}{R} \qquad (1)$$

(where R represents the distance between the platform and the center of the earth) and performing a double integration on the quantity $\alpha$ with respect to time between the limits $t_0$ to $t_1$ produces the correct angular displacement $\theta$ of the platform. This quantity $\theta$ may be used as a feedback signal to maintain the platform in the desired constant attitude with respect to the earth.

The accuracy of the basic system described above depends upon the accuracy with which the platform angular acceleration $\alpha$, can be detected and upon the accuracy with which the integration operations are performed. As hereinbefore mentioned, the problem of accurately indicating the vertical is made difficult because of the inability to separate acceleration due to gravity with aircraft acceleration. Because of this fact, straight forward mechanization of the rather simple theoretical solution to a vertical reference system will not produce a practical system. It does, however, serve as a basis for explaining the system actually employed in the device shown and described herein.

The geometry of an actual vertical indicating system utilizing a pendulum accelerometer is illustrated in Figure 4 wherein platform 1 swingably supports a pendulum 2 for movement about a hinge axis 3. Assuming platform 1 is moving in an $x$ direction with a velocity $V_x$ and an acceleration $A_x$ and assuming the direction $x$ to be normal to the true vertical with respect to the earth, the forces acting on pendulum 2 tending to cause swinging movement about its hinge axis 3 are those derived by the acceleration $A_x$ and the acceleration of gravity, $g$, which combine to produce a resultant acceleration $A_R$ as graphically illustrated. The reaction of pendulum 2 is to assume the direction of the resultant acceleration. This direction of the pendulum is called the apparent vertical. The angle between the apparent vertical and true vertical is called $\phi_x$. The angular displacement of the pendulum from the indicated vertical, which is the angle which may be physically measured, is identified as $\alpha_x$. The error angle between true vertical and indicated vertical is identified as $\epsilon_x$ while the angles $\theta_{tx}$ and $\theta_{ix}$ represent the angles between true vertical and base line 4 and between indicated vertical and the base line, respectively.

As is apparent from Figure 4 the angle $\phi_x$ which establishes the true vertical with respect to the apparent vertical is equal to the angle $\alpha_x$ minus the angle $\epsilon_x$. The angle $\alpha_x$ may be obtained as a known quantity in an actual physical configuration. The angle $\epsilon_x$ must be obtained from the solution to the performance equations hereinafter derived.

Referring to Figure 5, a block diagram of a single axis gyro pendulum system is shown, wherein the output $\alpha_x$ from an accelerometer 30 is applied to an amplifier 31. The output from amplifier 31 is applied to a damping channel 32 and an integrating channel 33. The outputs from the damping and integrating channels are algebraically added in mixer 34 and applied to gyro platform 35. The terms $K_{\alpha x}$, $K_1$, $K_2$, $K_3$ appearing in the Figure 5 block diagram represent the scale factors for each channel in the system and provide convenient terminology for deriving the performance equation on which the device of this invention is based.

The gyro reference platform control equation using the scale factors as identified in Figure 5 is $$\omega_{1x} = -K_{\alpha x}K_3\left[K_1 + \frac{K_2}{p}\right]\alpha_x \quad (2)$$

Where $\omega_{1x}$ represents the angular precession rate output of the gyro reference platform in response to the input $\alpha_x$ from the accelerometer; $K_{\alpha x}$ represents the accelerometer channel scale factor in volts per $g$; $K_1$ represents the damping channel scale factor in volts per volt; $K_2$ represents the integrator channel scale factor in volts per second per volt; $K_3$ represents the gyro platform scale factor in radians per second per volt; and $$\frac{1}{p}$$

represents the time integration operator.

The theoretical gyro reference platform precession rate required to maintain the platform normal to the vertical may be expressed as follows:

$$\omega_{(1H)x} = \omega_{(1E)x} + p\epsilon_x - \frac{V_x}{R_E} \pm \omega_D \quad (3)$$

Where $\omega_{(1H)x}$ represents the required inertial angular rotation rate of the platform; $\omega_{(1E)x}$ represents the component in the $x$ direction of the earth's daily angular rotation velocity; $V_x$ represents the component velocity of the platform as shown in Figure 4; $R_E$ represents the radius of the earth which is used as an approximation for the distance between the platform and the center of the earth; $\omega_D$ represents the gyro random drift rate; and $p$ represents the differential operator $$\frac{d}{dt}$$

The pendulum accelerometer output equation is, $$\alpha_x = \phi_x + \epsilon_x \quad (4)$$

where these terms are as defined in Figure 4.

Since $\phi_x$ is the angle between the apparent vertical and the true vertical and since the pendulum follows the direction of the resultant acceleration, the term $\phi_x$ may be represented by $$\frac{A_x}{g}$$

where $g$ is the acceleration of gravity. This term substituted in Equation 4 above, results in the following expression:

$$\alpha_x = \frac{A_x}{g} + \epsilon_x \quad (5)$$

To maintain the gyro reference platform normal to the vertical with respect to the earth in the $x$ coordinate direction, $\omega_{1x}$ must be made equal to $\omega_{(1H)x}$. Therefore, the above relationships are combined as follows:

$$\omega_{(1E)x} + p\epsilon_x - \frac{V_x}{R_E} \pm \omega_D + K_{\alpha x}K_3\left[K_1 + \frac{K_2}{p}\right]\left[\frac{A_x}{g} + \epsilon_x\right] = 0 \quad (6)$$

Now, by differentiating Equation 6, the following expression is obtained:

$$p^2\epsilon_x + K_{\alpha x}K_1K_3 p\epsilon_x + K_{\alpha x}K_2K_3\epsilon_x$$
$$= \left[\frac{1}{R_E} - \frac{K_{\alpha x}K_2K_3}{g}\right]A_x - K_{\alpha x}K_1K_3 p\frac{A_x}{g} \pm p\omega_D - p\omega_{(1E)x} \quad (7)$$

Defining the system parameters in Equation 7 in terms of the following gain constants:

$$\omega_n^2 = K_{\alpha x}K_2K_3 \quad (8)$$

$$2\delta\omega_n = K_{\alpha x}K_1K_3 \quad (9)$$

Where $\omega_n$ represents the system undamped natural frequency and $\delta$ represents the damping ratio, we may write the performance equation for the gyro reference system schematically shown in Figure 1:

$$p^2\epsilon_x + 2\delta\omega_n p\epsilon_x + \omega_n^2\epsilon_x$$
$$= \frac{A_x}{g}\left[\frac{g}{R_E} - \omega_n^2\right] - 2\delta\omega_n p\frac{A_x}{g} - p\omega_{(1E)x} \pm p\omega_D \quad (10)$$

The term $$\frac{g}{R_E}$$

as used in Equation 10 represents the earth's radius pendulum frequency $(\omega_{nE})^2$ sometimes referred to as the undamped natural frequency associated with Schuler tuning. By making earth's radius pendulum frequency, $\omega_{nE}$ equal to the system undamped natural frequency $\omega_n$, it is obvious from Equation 10 that the effect of acceleration in the system is eliminated. When this is done, the system is said to be Schuler tuned. The system then is responsive only to rate of change of acceleration, but even this sensitivity can be reduced to zero by making the damping $\delta$ in the system zero. Thus, it is seen when the system is undamped Schuler tuned, it is insensitive to acceleration.

In Equation 10 there exists a forcing function depending upon the rate of change of earth's angular rotation rate $p\omega_{(1E)x}$ and also one which is proportional to the rate of change of gyro drift $p\omega_D$ which must be eliminated in order to zero the error angle $\epsilon_x$ and provide an accurate indication of the vertical. The effects of rate of change of earth's rotation may be effectively neglected in mechanizing Equation 10, however, it is unavoidable that any such system will respond to random changes in gyro and system drift to an extent which varies directly with the period of the pendulum accelerometer. The longer the period, the greater will be the drift errors.

To minimize these errors introduced by gyro and system drift, the device shown in Figure 1 and hereinafter described employs variable tuning wherein in the presence of accelerations below a fixed threshold the system is operated at a much higher tuning frequency (shorter period) than when the magnitude of the accelerations are above the fixed threshold.

The actual gyro reference device as illustrated in Figures 1 and 2 includes the platform 1, which is supported on a base 7 forming part of an aircraft or other vehicle, and hereinafter referred to as an aircraft, for movement about 3 mutually perpendicular axes, X, Y, and Z. As indicated in Figure 2, platform 1 is rotatably carried by a cage 8 through shaft 9 for movement in azimuth about the Z axis. Cage 8 in turn is rotatably carried by a cage 10 through shaft 11 for rotation in pitch about the Y axis. Aircraft 7 rotatably carries the platform assembly including cage 10 for movement in roll about the x axis by means of a yoke 12 fixedly secured to the aircraft and forming a part of the aircraft structure. Rotation of the platform and cages 8 and 10 about the X, Y, and Z axes respectively are controlled by servo motors 13, 14 and 15. Suitable gearing such as that shown at 16 operatively connect the servo motors with the associated platform and cages.

Platform 1 supports a 3 axis gyro system comprising X, Y, and Z axes gyros, 17, 18 and 19 respectively, which connect with X, Y, and Z axes gyro torquers 20, 21 and 22 also carried on the platform. In addition to carrying the 3 axis gyro system, platform 1 supports an X axis accelerometer 23 and a Y axis accelerometer 24 as well as a resolver 56. Accelerometers 23 and 24 may be any of the conventional types capable of driving a position pick-up device such as a resolver 26. A 400 cycle per second excitation voltage is applied to the resolver in each channel (X and Y) to obtain an output voltage $\alpha$ proportional to the position of the pendulum relative to a reference position. The signal $\alpha$ is applied to a two gain amplifier 27 and to an amplitude sensitive relay circuit 28. The gain in amplifier 27 establishes the effective tuning of the pendulum accelerometer. When switch 29 is open as shown in Figure 1, current is caused to flow through a high resistance circuit 36 in the amplifier to simulate Schuler tuning (84.4 minute period). When switch 29 is closed, a circuit is completed through a relatively low resistance element 37 effectively changing the tuning of the pendulum to provide a much shorter period in the order of 1/10 of the Schuler tuning period. The most desirable off-Schuler tuning period is largely a matter of design choice in any specific vehicle installation. The shorter the period the smaller will be the errors due to rate of change of gyro drift, however, the circuit will then be more susceptible to errors as a result of aircraft accelerations. In any event, the acceleration threshold in switching between the shorter period and the Schuler tuning period should be established at an acceleration level such that aircraft accelerations introduce substantially no errors in the system while maintaining a sufficiently close coupling of accelerometers to minimize the effects of the rate of change of gyro and system drift. In the main, the use of the two tuning periods is sufficient to provide adequate accuracy in stabilization of the reference platform, however, if desired, any number of a plurality of different tuning frequencies may be switched into the circuit or the frequency may be varied continuously in response to different acceleration levels to increase the accuracy of the system still further.

Automatic control of switch 29 in each channel is accomplished in the acceleration sensitive relay circuit 28 wherein the $\alpha$ output signal from resolver such as 26 is applied to an amplifier 38. The output of amplifier 38 is then fed through a rectifier 39 and a smoothing circuit 41 for controlling a switch tube 42. Switch tube 42 actuates a relay 43. When the accelerometer output reaches a predetermined level (threshold level) the control voltage applied to switch tube 42 from smoothing circuit 41 is adequate to fire the tube and actuate relay 43, changing the accelerometer gain to effectively change the period of the system. When relay 43 is deenergized, switch 29 is open and in the position shown in Figure 1 and when the relay is energized, switch 29 is closed, providing a low impedance path for the energy which increases the amplitude of the output from amplifier 27 effectively simulating the shortened period of the accelerometer.

The output from amplifier 27, identified as $K\alpha$, is applied to an integrator 44 and a damping bypass circuit 45. The bypass circuit which may consist in a simple form, for example, of resistance elements to direct part of the output from amplifier 27 around the integrator, serves to introduce the damping term $\delta$ from Equation 10 into the Figure 1 device. The amount of damping which should be introduced depends upon the particular design. The function of the bypass circuit is to minimize the effects of aircraft acceleration during the operating phase of the system when the aircraft accelerations are below the threshold value and the shortened period of the pendulum is being employed.

When the system is Schuler tuned, that is when aircraft accelerations are above the threshold value, it is desired to reduce the damping to zero according to Equation 10. This is accomplished by the use of a second switch 46 which may be actuated by the same relay 43 which actuates switch 29. When relay 43 is de-energized, switch 46 is normally closed as shown in Figure 1, completing a circuit to a mixer 47 (one for the X and one for the Y channel) which combines the filter output with the output from integrator 44.

The outputs from mixers 47 as represented by leads 48 are applied to the associated gyro torquers 20 and 21 on platform 1. The shaft outputs from the gyro torquers are applied to the associated X and Y axes gyros 17 and 18. The outputs 57 and 58 from the X and Y axes gyros are converted to the aircraft axes and applied to the X axis servo 13 and the Y axis servo 14, respectively, to stabilize the platform normal to the vertical and execute the relationship set up by Equation 6 for zeroing the error angle $\epsilon$.

To maintain the platform fixed in azimuth with respect to a reference position, a Z axis gyro 19 is employed wherein the Z axis represents the vertical. Azimuth movement is about the Z axis from an established zero reference position. Since the drift rate of the Z axis gyro will vary with the location of the gyro reference device relative to the earth's latitude, it is torqued by an output 49 identified as $\omega_E$ sine latitude from a resolver 50. The output 49 from resolver 50 is applied to the Z axis gyro through a Z axis gyro torquer 22. By manually positioning resolver 50 as indicated by use of shaft 51 in accordance with the latitude location of the gyro reference device, the output signal $\omega_E$ sine latitude will correctly torque the Z axis gyro to maintain the platform in a constant azimuth position with respect to an earth reference and independent of the azimuth direction of movement of the aircraft carrying the gyro reference device. The output signal obtained through lead 52 from Z axis gyro 19 is applied to the Z axis servo motor 15 for rotating the platform about the Z axis as required to maintain it in a fixed azimuth position using a point on the earth as a reference. An azimuth angle output signal is obtained from servo motor 15 through lead 53 which signal is proportional to the angle between the reference azimuth and the azimuth direction of aircraft 7. The azimuth output signal may be applied, for example, to a slaved magnetic gyro compass indication system 54 for navigation. The accuracy of the gyro reference device makes it ideally suited for such use on long range vehicles of any kind where reliable heading information is required.

Since the platform is stabilized in azimuth, the X and Y axes gyro outputs may be different from the X and Y axes of the aircraft. In order to transfer the roll and pitch data from the X and Y axes of the stabilized platform to the X and Y axes of aircraft 7, the output shaft 55 of Z axis servo motor 15 operatively engages a resolver 56 as well as the Z axis platform drive. Resolver 56 receives the X and Y axis gyro outputs through leads 57 and 58 respectively. The outputs from resolver 56 as represented by leads 59 and 60 represent the pitch and roll angles respectively of the aircraft relative to the plane defined by the platform. This roll and pitch information is then applied to the various radar and flight control devices 61 carried in the aircraft as well as to the X and Y axes servos 13 and 14 for driving the platform through output shafts 62 and 63.

In operation the gyro reference device is initially oriented into the desired reference attitude establishing X, Y and Z axes for the stabilized platform 1. With the device mounted on an aircraft, the X and Y axes accelerometers 23 and 24 provide outputs which are operated upon to provide correction signals driving servo motors 13 and 14, maintaining platform 1 stabilized in the initial attitude relative to the earth regardless of the movement of the aircraft.

The platform is maintained in the reference azimuth position through the use of the Z axis gyro 19 and servo motor 15. By manually turning shaft 51 on resolver 50 as indicated in Figure 1, to the proper latitude setting, a correction signal eliminating the effects of the earth's rotation is obtained for the Z axis gyro. The correction signal is applied to the gyro through the Z axis gyro torquer 22. Driving servo motor 15 with the output from gyro 19, stabilizes the platform about the Z axis and provides azimuth heading information.

The ability of the gyro reference device to operate with a high degree of accuracy is largely due to the variable tuning concept wherein the system continuously operates, but in different tuning modes depending upon the magnitude of the aircraft accelerations. By employing a system which will simulate a short period of the pendulum so long as the accelerations are below a threshold level and a long period substantially that of a Schuler tuned pendulum system when the accelerations exceed the threshold level, the errors due to aircraft accelerations normally introduced by a simple mechanization of the system represented by Figure 3 is substantially eliminated. At the same time, the errors due to gyro and system drift are minimized by allowing a higher coupling of accelerometers while the aircraft accelerations are below the threshold level.

In practice it may be desirable to introduce into the platform stabilizing circuitry a correction signal for the Coriolis effect. This may be done using conventional techniques and in order not to unduly complicate the description, this detail which forms no part of the invention is omitted.

While the long period mode of operation is preferably at Schuler tuning, any period approximating Schuler tuning might be used to obtain substantially the full benefits of the invention. Also, the effects of aircraft accelerations may be minimized by changing the period of the system continuously in response to changes in the magnitude of the accelerations rather than by employing finite number of different operating modes. It is considered obvious that such modifications may be made without departing from the teachings of the invention.

As a modification it is pointed out that the integrators used in the system may be eliminated without departing from the teachings of this invention if the corrections for earth's rate and ground speed are obtained by other means and applied directly to the gyro torquers. In this instance acceleration switch 29 would be used to remove the acceleration signal from the gyro in the presence of accelerations exceeding the threshold level.

While the stabilized platform reference device has been described herein primarily with regard to use in aircraft, it obviously may be used on any type of vehicle. Those skilled in the art will also recognize that the use of rate sensitive devices other than gyros may be employed in the system.

It is understood that certain alterations, modifications and substitutions such as those mentioned hereinabove may be made to the instant disclosure without departing from the spirit and scope of this invention as defined by the appended claims.

I claim:

1. A gyro reference device for providing direction and control information to a vehicle adapted to move relative to the earth comprising, a platform pivotally carried on said vehicle, acceleration sensitive means carried on said platform, amplifier means responsive to said acceleration sensitive means and providing signal gain simulating a long period pendulum system so long as the accelerations are above a threshold level, switch means associated with said amplifier and responsive to actuation at said threshold level for changing the signal gain to simulate a short period pendulum system so long as accelerations are below the threshold level, integrator means responsive to said signal and providing an output representing the integral thereof, and gyro means responsive to the integrator output and stabilizing the platform in an initial reference position in the presence of changes in attitude of the vehicle on which it is mounted.

2. A gyro reference device for use on vehicles such as aircraft comprising, a platform pivotally carried on the vehicle, a pendulum accelerometer carried on said platform and providing an output signal representing the magnitude of the applied acceleration forces, variable gain amplifier means response to said output signal, switch means associated with said amplifier means and establishing a plurality of gain levels, each determined by the magnitude of the accelerometer output signal, integrator means responsive to the output from said amplifier means, damping means responsive to the output from said amplifier means, mixer means combining the outputs from said integrator and damping means, but only so long as the vehicle accelerations remain below a predetermined acceleration threshold, and gyro means responsive to the mixer means output and operatively engaging the platform to stabilize the same with respect to fixed reference axes.

3. In a gyro reference device of the class described, an accelerometer having an output representing acceleration loads applied to the device, a variable gain amplifier responsive to the accelerometer output, and gain control switch means responsive to a threshold level of the accelerometer output for actuation, changing the gain of said amplifier and providing a plurality of operating modes simulating a long period pendulum above the threshold level and a short period pendulum below the threshold level.

4. A gyro reference device for use on aircraft or the like comprising, a platform pivotally carried on said aircraft, an accelerometer carried on said platform and providing an output representing the actual platform accelerations, variable gain amplifier means responsive to the accelerometer output, gain control switch means responsive to a threshold level of the accelerometer output for actuation changing the gain of said amplifier means to provide a plurality of operating modes simulating a long period pendulum above the threshold level and a short period pendulum below the threshold level, integrator means responsive to the output from said amplifier means, gyro means carried on said platform and responsive to the output from said integrator means to produce a platform control signal, and servo motor means responsive to the platform control signal and operatively engaging the platform to maintain the latter in an initial reference position regardless of the changes in attitude of the vehicle on which it is mounted.

5. A gyro reference device comprising, a base, a platform pivotally carried on said base, accelerometer means carried on said platform and providing an output representing the resultant acceleration of said base about two of the three mutually perpendicular axes, amplifier means responsive to the outputs from said accelerometer means, switch means connecting with said amplifier means and responsive to the magnitude of the accelerometer means outputs to change the gain of said amplifier means and thereby simulate a plurality of accelerometer tuning frequencies, integrator means responsive to the outputs from said amplifier means, gyro means responsive to the outputs from the integrator means, servo means responsive to the output from said gyro means and operatively engaging said platform and controlling movement thereof about two mutually perpendicular axes, stabilizing the platform in the presence of changes in the attitude of the base on which the platform is carried.

6. A gyro reference device for use on vehicles such as aircraft comprising, a platform pivotally carried on the vehicle, motor means operatively engaging said platform and controlling the pivotal movement thereof, gyro means carried on said platform and connecting with said motor means for actuating the latter in response to an output from the gyro means, accelerometer means carried on said platform generating an output signal proportional to the applied acceleration loads, a variable gain amplifier responsive to the accelerometer output signal, switch means associated with the amplifier and responsive to a threshold acceleration level changing the gain of the amplifier, and integrator means responsive to the amplifier output and torquing said gyro means to maintain said platform in an initial reference position regardless of the changes in attitude of the vehicle on which it is mounted.

7. A gyro reference device for use on vehicles such as aircraft comprising, a platform pivotally carried on the vehicle, gyro means carried on said platform and drivingly engaging the platform to control its pivotal movement, accelerometer means carried on said platform, integrator means coupling the accelerometer means with said gyro means to effect displacement of said platform relative to the supporting vehicle as required to maintain the platform in its initial reference position, and a variable gain amplifier interposed between said accelerometer means and said integrator means and establishing a system gain which changes automatically in response to an acceleration threshold whereby the system may operate continuously and in the presence of vehicle accelerations to stabilize the platform.

8. A vertical reference device for use on vehicles such as aircraft comprising, a platform pivotally carried on the vehicle, variable tuning accelerometer means detecting platform accelerations, an integrator responsive to the output from said accelerometer means, rate sensitive responsive to the integrator output and operatively engaging said platform to stabilize the same in a reference position, and means responsive to the magnitude of the accelerations for controllably varying the tuning of the accelerometer means whereby the system errors may be minimized.

9. A gyro reference device for use on vehicles such as aircraft comprising, a platform carried on the vehicle for movement about three mutually perpendicular axes, gyro means carried on said platform and having output signals positioning said platform about said axes, variable tuning accelerometer means responsive to platform accelerations and generating output signals torquing said gyro means to maintain said platform in the initial attitude with respect to the earth regardless of the changes in attitude of the vehicle on which it is mounted, and tuning control responsive to the magnitude of the platform accelerations and changing the tuning of said accelerometer means to minimize the effects of vehicle accelerations and gyro drift.

10. A gyro reference device for use on vehicles such as aircraft comprising, a platform carried on the vehicle for movement about three mutually perpendicular axes, gyro means carried on said platform and having output signals positioning said platform about said axes, means detecting platform accelerations, a variable gain amplifier responsive to said means and generating an output signal torquing said gyro means to maintain said platform in the initial attitude with respect to the earth regardless of the changes in attitude of the vehicle on which it is mounted, and switch means associated with said amplifier and establishing a plurality of gain settings in response to the magnitude of the platform accelerations.

11. A reference device for use on vehicles such as aircraft comprising, a platform pivotally carried on the vehicle, drive means operatively connecting with said platform and controlling the movement thereof, variable tuning acceleration sensitive means generating an output representing vehicle acceleration and controlling said drive means, and means varying the tuning of the acceleration sensitive means in response to the magnitude of the accelerations for simulating a pendulum of variable length and minimizing system errors resulting from drift and vehicle motion.

12. A reference device for use on vehicles such as aircraft comprising, a platform pivotally carried on the vehicle, drive means operatively engaging said platform and controlling the pivotal movement thereof, acceleration sensitive means carried on said platform and generating an output signal representing the magnitude of the acceleration loads applied to the platform in at least one co-ordinate direction, an amplifier responsive to the output signal from said acceleration sensitive means, gain control means associated with said amplifier and being responsive to the magnitude of the platform accelerations for actuation providing low gain amplifier operation in the presence of high accelerations and high gain amplifier operation in the presence of small accelerations, integrator means responsive to the output of said amplifier means, and damping means responsive to the output of said amplifier means, said integrator means connecting with the platform drive means for actuating the drive means and maintaining the platform in an attitude fixed with respect to the earth in the presence of changes in attitude of the vehicle on which the platform is mounted, and switch means responsive to platform accelerations for actuation and coupling said damping means to said platform drive means only so long as the accelerations are below a predetermined threshold level for eliminating errors otherwise resulting from the effect of short period vehicle acceleration loads.

13. A direction reference device for use on vehicles subject to random accelerations comprising, a platform pivotally carried on the vehicle and defining a reference plane, accelerometer means carried on said platform and sensing platform accelerations in at least two directions in the reference plane, variable gain amplifier means connecting with said accelerometer means and providing an output representing the platform accelerations, gain control means connecting with said amplifier means and responsive to the accelerometer means for changing the gain of the amplifier means in response to changes in magnitude of the platform accelerations, and drive means operatively engaging said platform for controlling the pivotal movement thereof in response to the output from said amplifier means.

14. A direction reference device for use on vehicles subject to random accelerations comprising, a platform pivotally carried on the vehicle and defining a reference plane, accelerometer means carried on said platform and sensing platform accelerations in at least two directions in the reference plane, variable gain amplifier means connecting with said accelerometer means and providing an output representing the platform accelerations, gain control means connecting with said amplifier means and responsive to the accelerometer means for inversely changing the gain of the amplifier means in response to changes in magnitude of the platform accelerations, and drive means operatively engaging said platform for controlling the pivotal movement thereof in response to the output from said amplifier means.

15. A direction reference device for use on vehicles subject to random accelerations comprising, a platform pivotally carried on the vehicle and defining a reference plane, accelerometer means carried on said platform and sensing platform accelerations in at least two directions in the reference plane, and providing outputs proportional thereto, amplifier means responsive to the outputs from said accelerometer means and providing platform control outputs, amplifier gain control means responsive to the magnitude of the platform accelerations for actuation to change the gain of said amplifier means at a fixed threshold level whereby the effects of vehicle random accelerations are suppressed, and means operatively engaging said platform for controlling the pivotal movement thereof in response to the platform control output from said amplifier means.

16. A direction reference device for use on vehicles subject to random accelerations comprising, a platform pivotally carried on the vehicle and defining a reference plane, accelerometer means carried on said platform and sensing platform accelerations in at least two directions in the reference plane and providing outputs proportional thereto, variable gain amplifier means responsive to the outputs from said accelerometer means and providing platform control outputs, gain control switch means connecting with said accelerometer means and said amplifier means and responsive to at least one threshold level of the platform accelerations for actuation to establish the operating gain of said amplifier means to minimize the response to vehicle random accelerations, and rate sensitive means operatively engaging said platform for controlling the pivotal movement thereof in response to the platform control output from said amplifier means.

17. In a device providing a stabilized reference axis in the presence of random acceleration signals comprising, means generating an output representing the magnitude of acceleration in at least one direction, a variable gain amplifier responsive to the output from said means, and gain control means responsive to the magnitude of the output and controllably varying the gain of said amplifier to simulate a pendulum accelerometer having a period which automatically changes in response to the changes in the magnitude of acceleration.

18. A stabilized reference device for use on vehicles subject to random accelerations comprising, a platform, variable tuning accelerometer means generating a signal representing the magnitude of the accelerations applied to the platform, means responsive to the magnitude of the acceleration signal and controllably varying the tuning of said accelerometer means to simulate a pendulum having one period so long as the signal is below a threshold level and a pendulum having a different period substantially longer than said one period so long as the signal is above the threshold level, and platform drive means responsive to said signal and controlling the attitude of the platform.

References Cited in the file of this patent

UNITED STATES PATENTS

| 2,696,566 | Lion | Dec. 7, 1954 |
| 2,729,108 | Vacquier et al. | Jan. 3, 1956 |
| 2,762,123 | Schultz | Sept. 11, 1956 |
| 2,835,132 | Vacquier | May 20, 1958 |

OTHER REFERENCES

Aviation Week, pp. 42–44, 94–99, 101, 105–107, January 9, 1956.